UNITED STATES PATENT OFFICE.

WILLIAM HENRY CORY, OF NEW YORK, N. Y., ASSIGNOR TO THE CORY ARTIFICIAL FUEL COMPANY.

CARBONACEOUS FUEL AND PROCESS OF MAKING THE SAME.

SPECIFICATION forming part of Letters Patent No. 332,498, dated December 15, 1885.

Application filed January 5, 1884. Renewed September 1, 1885. Serial No. 175,929. (No specimens.)

*To all whom it may concern:*

Be it known that I, WILLIAM HENRY CORY, a citizen of the United Kingdom of Great Britain and Ireland, and a resident of the city of New York, in the county of New York and State of New York, have invented certain new and useful Improvements in Carbonaceous Fuel and the Process of Making the Same, of which the following is a specification.

My invention has for its object the forming into cakes or masses coal or carbonaceous dust, whereby the same may be readily handled and transported, and be burned in furnaces, grates, and elsewhere as fuel.

To carry my invention into effect, I mix with the carbonaceous dust silicate of potash or silicate of soda and a small portion of alumina. These three ingredients when mixed form a compact mass which can be burned as fuel; but I prefer to compress it into molds or shapes of any desired size or shape, either by hydraulic or other pressure, shortly after mixing.

The combination of the alumina with the silicate of soda produces silicate of alumina, which binds the carbonaceous dust together, and is insoluble in water and infusible by ordinary heat.

The porportion of silicate of potash or soda to carbonaceous dust which I prefer to use is about three to one hundred, but of course this proportion may be varied. The best results will be obtained when only just enough of the silicate of potash or soda when converted into silicate of alumina to hold the dust together during combustion is used. The amount of alumina used of course depends upon the amount of silicate of potash or soda used, the best results following the use of only just so much alumina as will convert the silicate of potash used into silicate of alumina.

It is obvious that I can use any kind of coal or carbonaceous dust, either alone or mixed, in practicing my invention, and that small coal may be mixed therewith.

What I claim is—

1. The process herein described of making artificial fuel, which consists in mixing together carbonaceous dust and silicate of soda, adding alumina thereto to produce silicate of alumina and bind the dust together, and render it insoluble and infusible, and finally compressing the mass, substantially as described.

2. An artificial fuel consisting of carbonaceous dust, silicate of potash, and alumina, the dust being bound together by the alumina to produce an insoluble and infusible mass, substantially as described.

Signed, at the city of New York, in the county of New York and State of New York, this 4th day of January, A. D. 1884.

WILLIAM HENRY CORY.

Witnesses:
HENRY ARDEN,
GEO. T. HANNING.